(No Model.) 2 Sheets—Sheet 1.
H. AIKEN.
WATER COOLER VALVE FOR FURNACES.
No. 391,448. Patented Oct. 23, 1888.
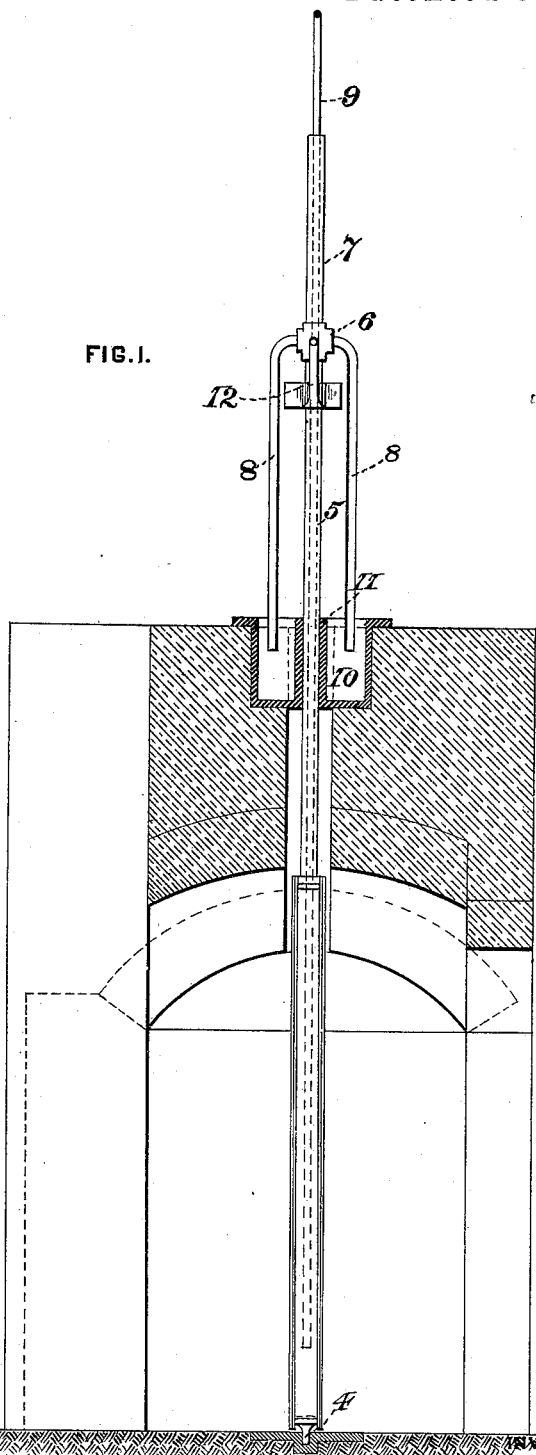
FIG. I.
WITNESSES:
R. H. Whittlesey
F. E. Gaither
INVENTOR,
Henry Aiken.
by Darwin S. Wolcott
Att'y.

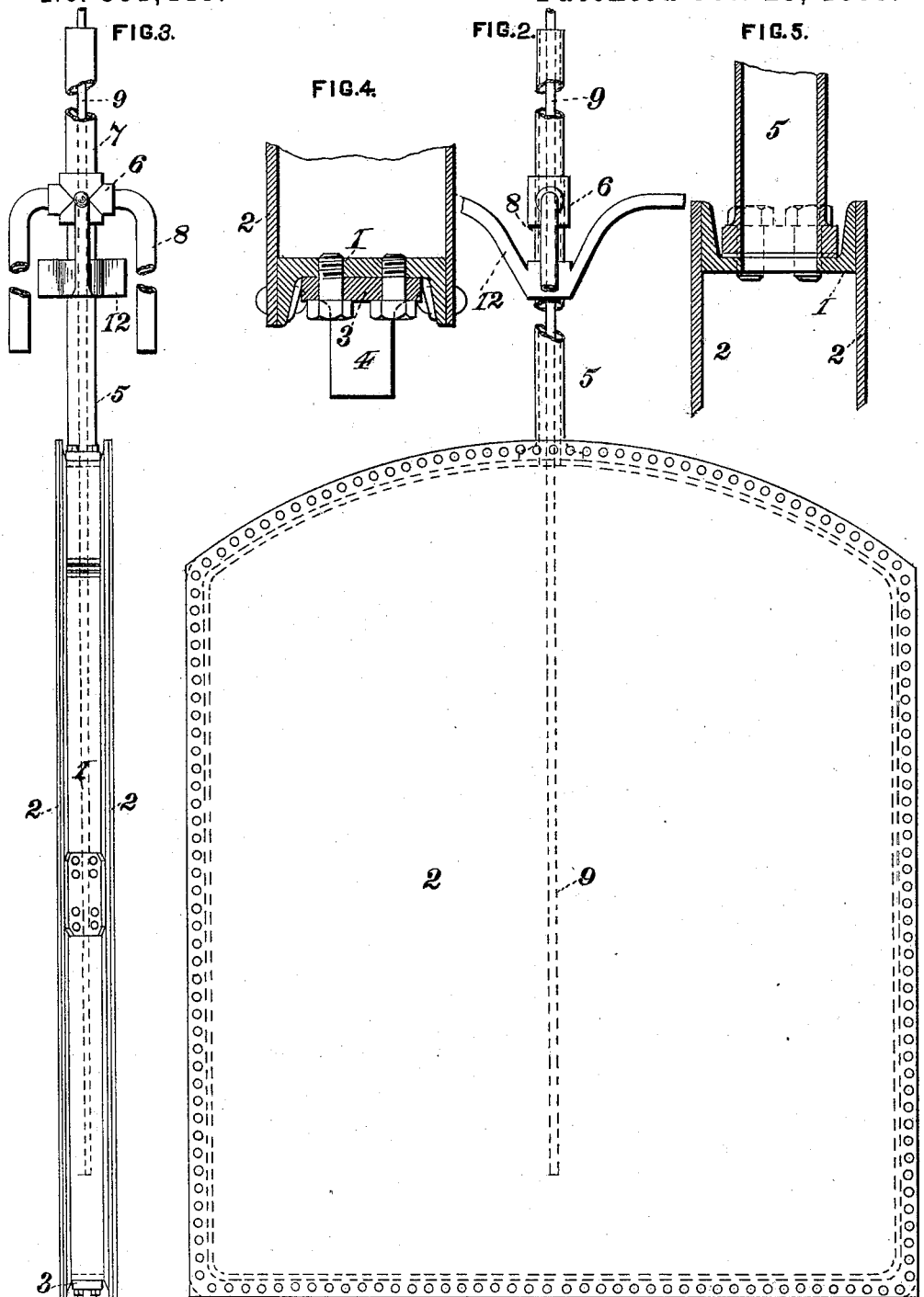

United States Patent Office.

HENRY AIKEN, OF HOMESTEAD, PENNSYLVANIA.

WATER-COOLER VALVE FOR FURNACES.

SPECIFICATION forming part of Letters Patent No. 391,448, dated October 23, 1888.

Application filed May 2, 1887. Serial No. 236,788. (No model.)

*To all whom it may concern:*

Be it known that I, HENRY AIKEN, residing at Homestead, in the county of Allegheny and State of Pennsylvania, a citizen of the United States, have invented or discovered certain new and useful Improvements in Water-Cooler Valves for Furnaces, of which improvements the following is a specification.

The invention herein relates to certain improvements in water-valves employed in regulating the movement of gases and air in gas and other furnaces, and has for its object such a construction and arrangement of parts as will facilitate and cheapen the manufacture and repair of the same; and in general terms the invention consists in the construction and combination of parts, substantially as hereinafter more fully described and claimed.

In the accompanying drawings, forming a part of this specification, Figure 1 is a sectional elevation of a portion of a flue of an open-hearth furnace. Fig. 2 is a view in side elevation of my improved valve. Fig. 3 is an edge view of the same, and Figs. 4 and 5 are sectional detail views on an enlarged scale.

The body of the valve consists of the frame 1, which may be formed of cast iron or steel in one piece, or of channel-iron in one piece, bent to shape and its ends secured together, or of a series of channel-bar sections riveted together, as shown, and two plates of wrought iron or steel secured at their edges by rivets to the flanges of the frame, or in any other suitable manner, thus forming an internal water-space of a width equal to the width of the channel-irons or frame. One of the pivotal journals is formed by bolting or otherwise securing the plate 3, having the pin 4 formed thereon, to the frame 1, as shown in Fig. 4, the other journal or pivot being formed by the pipe 5, having a flange which is bolted to the frame diametrically opposite the pin 4. The opposite end of the pipe 5 is screwed into a cross-coupling, 6, a prolongation, 7, of the pipe 5 being screwed into the opposite end of the coupling. Into the lateral branches of the coupling are inserted the pipes 8, whose outer ends are bent down into approximate parallelism with the pipe 5.

Through the pipes 7 and 5 is passed the pipe 9, of smaller diameter than the pipe 5, said pipe 9 extending across the body of the valve nearly to the opposite side, as indicated by dotted lines, Fig. 1, and having its outer end connected to any suitable source of water-supply. The water, after filling the body of the valve, passes up the pipe 5 and escapes thence by the pipes 8 into a tank or basin, 10, surrounding the pipe-journal 5, and provided with a hollow central boss, 11, forming a bearing for the pipe-journal. This basin or tank 10, embedded in the masonry forming the flue or passage in which the valve is located, (see Fig. 1,) is provided with a suitable outlet for the escape of the waste water therefrom.

Although I have shown and described the valve as adapted for use in a vertical position, I do not wish to be understood as limiting myself to any special circumferential shape or contour or any particular position while in use.

The operating-handles 12 are preferably clamped or otherwise secured to the hollow trunnion or pipe 5 below the coupling 6 to avoid straining the coupling and joints in turning the valve.

I claim herein as my invention—

1. A valve having in combination a frame, side plates secured to opposite edges of the frame, thereby forming a chamber for the reception of a cooling-fluid, a pivot-pin and a hollow trunnion secured to opposite sides of the frame, the trunnion forming an outlet for the escape of the fluid, and an inlet-pipe passing through the hollow trunnion, substantially as set forth.

2. A valve having in combination a frame formed of channel-bars, side plates secured to the flanges of the frame, trunnions secured on opposite sides of the frame, one of which trunnions is hollow, forming an outlet from the valve, and is provided with lateral branches, a tank surrounding the hollow trunnion and provided with a hollow boss or projection forming a bearing for the trunnion, and an inlet-pipe, substantially as set forth.

In testimony whereof I have hereunto set my hand.

HENRY AIKEN.

Witnesses:
DARWIN S. WOLCOTT,
R. H. WHITTLESEY.